United States Patent [19]
Phillips et al.

[11] Patent Number: 5,871,185
[45] Date of Patent: Feb. 16, 1999

[54] EQUIPMENT SUPPORT STAND

[75] Inventors: Edward Phillips; Thomas Pfeiffer, both of Burbank, Calif.

[73] Assignee: Matthews Studio Equipment Inc., Burbank, Calif.

[21] Appl. No.: 767,514

[22] Filed: Dec. 16, 1996

[51] Int. Cl.⁶ .................................................. F16M 11/38
[52] U.S. Cl. ........................................ 248/167; 248/165
[58] Field of Search ..................... 248/165, 167, 248/439, 172, 920, 924, 163.1

[56] References Cited

U.S. PATENT DOCUMENTS

| | | | |
|---|---|---|---|
| 2,544,615 | 3/1951 | Raymond | 248/167 |
| 3,262,406 | 7/1966 | Nickolaisen | 248/167 |
| 4,629,150 | 12/1986 | O'Callaghan | 248/167 |
| 4,801,123 | 1/1989 | Lynch | 248/165 |
| 5,106,048 | 4/1992 | Lebar et al. | 248/167 |

*Primary Examiner*—Ramon O. Ramirez
*Assistant Examiner*—Willie Berry, Jr.
*Attorney, Agent, or Firm*—Michael A. Painter

[57] ABSTRACT

An equipment support stand for mounting and positioning photographic, motion picture and video accessories and the like. A riser comprising a plurality of telescoping shafts is coupled to at least three rotatable support legs which, when activated, will position the riser vertically relative to the mounting surface. Each support leg is integral with a positioning sleeve which is rotatably coupled about the lower end of the riser. Each positioning sleeve includes at least one engagement surface which is adapted to interface with the adjacent positioning sleeve or sleeves. When engaged, each of the three support legs are angularly spaced from adjacent support legs by 120° of arc. In a closed state, the support legs may be rotated about the riser and be placed in a co-planar relationship with one another to facilitate storage and transport.

6 Claims, 2 Drawing Sheets

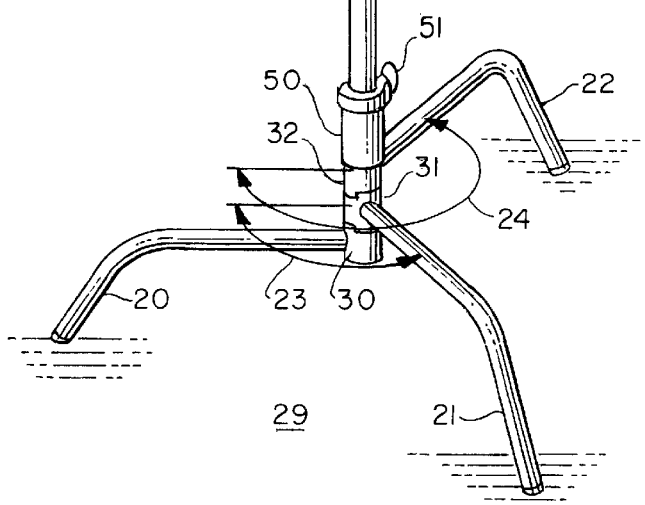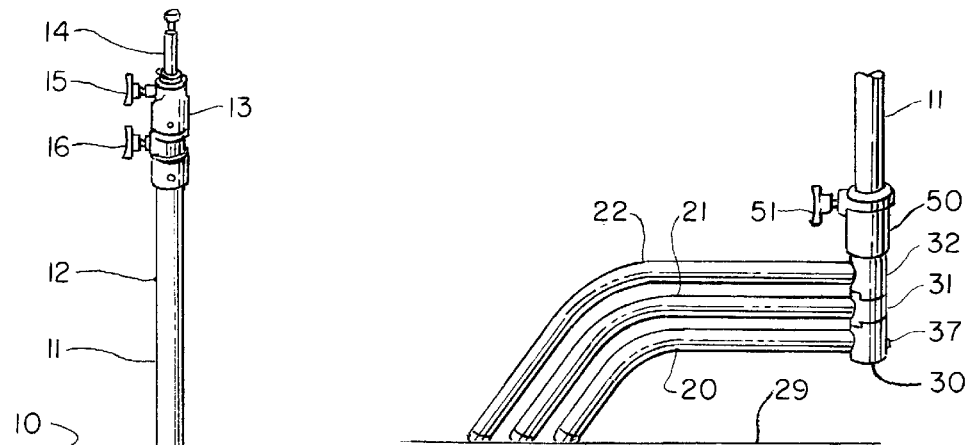

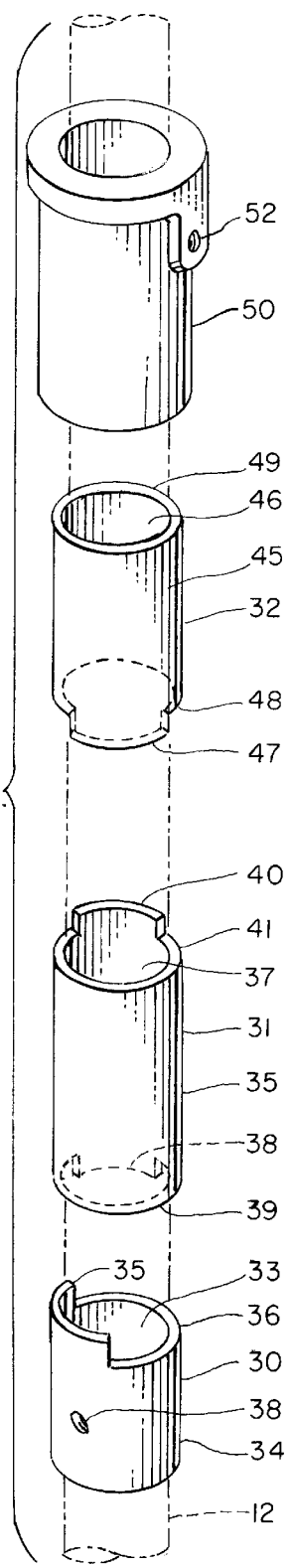
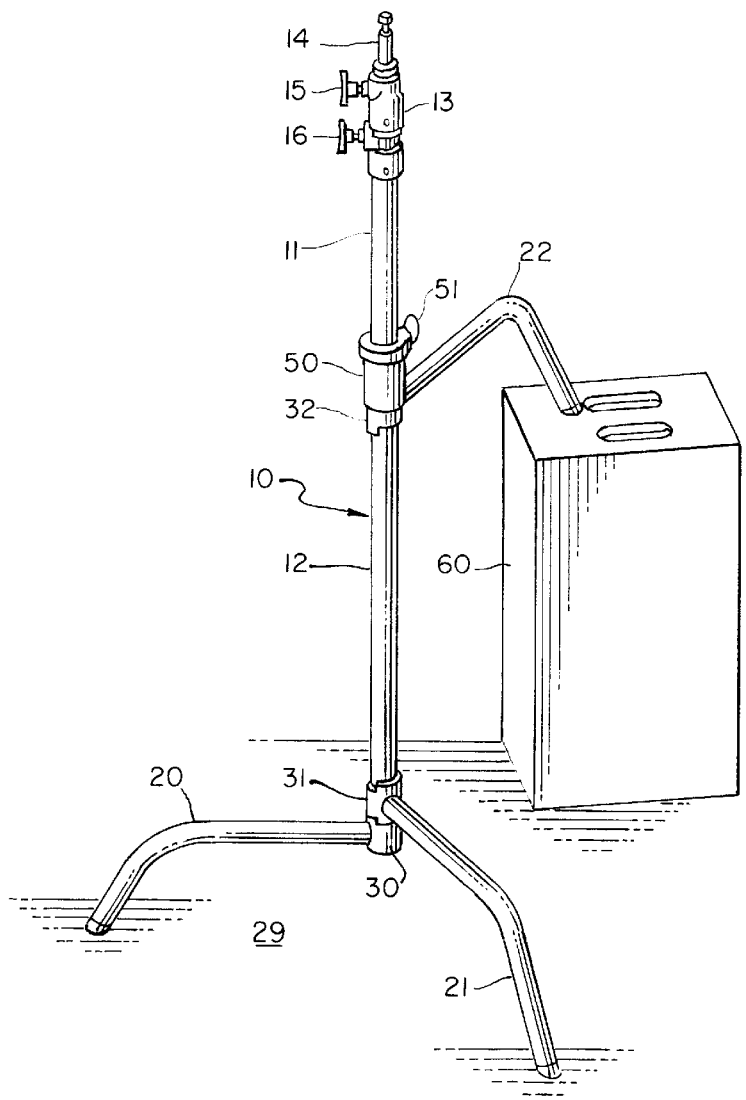

EQUIPMENT SUPPORT STAND

BACKGROUND OF THE DISCLOSURE

1. Field of the Invention.

The present invention generally relates to mechanical supporting apparatus, and more particularly, to supporting apparatus used to positionally support photographic, motion picture and video accessories.

2. Prior Art.

As the photographic, motion picture and television industries have evolved and developed, demand for equipment which is capable of enhancing the final product has increased. This is led to the use of accessories which are integral and necessary to the filming and/or recording of visual and audible images. These accessories are, for example, such items as light reflectors, filters and microphones. The effective use of these accessories requires that they be placed in precisely the correct location to permit optimum recording of visual images and/or sound.

The prior art illustrates numerous designs for apparatus used to vertically position photographic, motion picture and video accessories. The most basic design constitutes a plurality of supporting legs, typically in the form of a fixed tripod which is integral with a vertical riser. The photographic, motion picture and video accessories which are to be positioned are secured directly or indirectly at the upper end of the vertical riser. The inadequacies of this design are inherent in its structure. Since all support members are in a fixed position relative to each other and the riser, they cannot be adjusted to compensate for changing conditions which result from the mounting surface upon which the apparatus is used. For example, where cables or other obstruction of varying heights are present, the fixed relationship of the support legs obviate the ability to change the height of the supporting apparatus or the individual support legs to compensate for the environment. In addition, the inability to fold or otherwise collapse the stand renders the design inefficient for storage or transport.

Another design for an equipment support apparatus disclosed by the prior art utilizes a supporting tripod wherein each of the three support legs are independently rotatable about an equipment riser. Although the support legs may be placed in a co-planar position to thereby reduce the problems inherent in storage and in transporting same, the inability to efficiently lock the support legs in a stable position creates problems which are resolved by the present invention. In the prior art design, each of the support legs is required to be independently rotatable with respect to one another about the riser shaft. As a result, unless easily and accurately positioned with respect to one another, the positioning of the support legs will be unstable and create the possibility of damage to the supported equipment.

The present invention resolves the problems inherent in the designs disclosed by the prior art. The present invention equipment support stand employs support legs which are integral with positioning sleeves. The sleeves are adapted to engage one another in a manner which will stabilize the support legs and accurately position them in relation to one another. In addition, since the positioning sleeves determine the angular separation of each support leg relative to the others, the present invention design insures support stability while simultaneously resolving the problems inherent in storage and transport.

SUMMARY OF THE INVENTION

The present invention comprises an improved equipment support stand used to secure and position photographic, motion picture and video accessories. The equipment to be mounted is directly or indirectly coupled to the upper end of a vertically oriented riser. The riser is constructed of a plurality of annularly disposed, extendable telescoping shafts, each of which is independently lockable in a position relative to the radially adjacent shaft or shafts. The stand support is coupled to the lower end of the riser and comprises at least three support legs. Each support leg is integral with a positioning sleeve which is adapted to be rotatably coupled about the longitudinal axis of the riser. The positioning sleeves are rotatably coupled about the riser in axial abutment with one another. The positioning sleeves each incorporate an engagement surface at one or both ends thereof which are adapted to interface with the engagement surface of an adjacent sleeve or sleeves. When in the open position, the support legs will be angularly spaced from each other by 120° of arc thereby forming a stable supporting means for maintaining the riser in a vertical position. The support legs may be rotated relative to one another about the riser to place the support legs in a coplanar position for storage or transport.

It is therefore an object of the present invention to provide an improved equipment support stand for photographic, motion picture and television accessories.

It is another object of the present invention to provide an equipment support stand having a plurality of supporting legs which are rotatable relative to one another.

It is still another object of the present invention to provide an improved equipment support stand having supporting legs which are rotatable relative to one another which are securable at fixed angular intervals.

It is still yet another object of the present invention to provide an improved equipment support stand which is simple and inexpensive to fabricate.

It is still yet another object of the present invention to provide an improved equipment support stand which is simple to rapidly deploy for usage and to rapidly collapse for storage.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 1 is a front perspective view of the present invention equipment support stand.

FIG. 2 is a side elevation view of the present invention equipment support stand illustrating the support legs in a closed position.

FIG. 3 is a side elevation view of the lower support leg and lower positioning sleeve.

FIG. 4 is an assembly view of the positioning sleeves and locking member disposed about the vertical riser shown in FIG. 1.

FIG. 5 illustrates the present invention equipment support stand partially mounted upon an obstruction member.

DESCRIPTION OF THE PRESENTLY PREFERRED EMBODIMENT

The present invention equipment support stand may be best seen by reference to FIG. 1 wherein the equipment support stand is generally designated by the reference numeral 10. Equipment support stand 10 is adapted for mounting and positioning photographic, motion picture and video accessories. Equipment support stand 10 comprises a vertically oriented riser 11 which is constructed of a cylindrical base shaft 12 and a plurality annularly disposed, telescoping extension shafts 13 and 14. Although the present invention is illustrated employing a riser 11 comprising three extendable shafts 12, 13 and 14, it is understood the scope of the present invention covers the use of either a single shaft or multiple telescoping shafts.

An objective of the present invention is to provide an equipment support stand which is used to mount or otherwise support photographic, motion picture and television accessories. The accessories are mounted or otherwise coupled to the upper extension shaft 14 by direct or indirect couplings (not shown). Extension shaft 14 may be elevated relative to shaft 13 and secured in place by a conventional locking clamp 15. In a like manner, shaft 13 may be elevated relative to base shaft 12 and be secured in place through the use of a conventional locking clamp 16.

Another objective of the present invention is to provide an equipment support stand having a plurality of supporting legs which are rotatable relative to one another to thereby provide an efficient structure for storage and transport. As can be seen in FIG. 1, the present invention equipment support stand 10 utilizes a tripod formed from independently rotatable support legs 20, 21 and 22. When in use, support legs 20, 21 and 22 are angularly separated from each other by 120° of arc as illustrated by the angular references 23 and 24. As shown in FIG. 2, when closed for storage or transport, support legs 20, 21 and 22 lie in a coplanar relationship with one another.

The structural relationship between support legs 20, 21 and 22 may be best understood by reference to FIG. 3 and FIG. 4. FIG. 3 illustrates lower support leg 20. Lower support leg 20 typically comprises an articulated cylindrical shaft, one end being in contact with the ground or other supporting surface 29, the opposing end being integral with a first positioning sleeve 30. Although lower supporting leg 20 is typically welded to lower positioning sleeve 30 to form a secure structure, it is understood the coupling between lower support leg 20 and lower positioning sleeve 30 may be implemented by other conventional means. As can be seen in FIG. 1 and FIG. 2, mid-support leg 21 and upper support leg 22 are respectively coupled to mid-positioning sleeve 31 and upper positioning sleeve 32, respectively, in the same manner as shown in FIG. 3.

As stated, it is an objective of the present invention to provide support legs which are rotatable between the open, operating condition shown in FIG. 1 and the storage condition shown in FIG. 2. The structure of the positioning sleeves 30, 31 and 32 provide the structure to meet the defined objective. Lower positioning sleeve 30 comprises a substantially cylindrical member 34 having a central bore 33 longitudinally disposed therethrough. Bore 33 is adapted to be slidably disposed upon base shaft 12 and be rotatable thereabout. The upper end of lower positioning sleeve 30 is circumferentially divided into an engagement sector 35 and a receiving sector 36. Relative to the longitudinal axis of base shaft 12 and lower positioning sleeve 30, engagement sector 35 constitutes 120° of arc. Receiving sector 36 is defined by a complementary 240° of arc. As can be best seen in FIG. 2, lower positioning sleeve 30 is secured at the lower terminus of base shaft 12 by conventional means such as a set screw 37. Set screw 37 engages threaded apertures 38. To secure lower positioning sleeve relative to base shaft 12, set screw 37 is urged inwardly until it is in firm contact with the outer surface of base shaft 12.

Mid-positioning sleeve 31 is constructed of a cylindrical member 35 having a central bore disposed therethrough along its longitudinal axis. Mid-positioning sleeve 31 is adapted to be slidably coupled upon base shaft 12, but be in frictional engagement therewith. As will be explained in detail hereinbelow, although mid-positioning sleeve 31 is rotatable about base shaft 12, the frictional engagement between central bore 37 and the outer surface of base shaft 12 will provide stability for supporting accessories without the need of a downward locking force. The lower terminus of mid-positioning sleeve 31 is formed into an engagement sector 38 and a receiving sector 39. Like engagement sector 35 of lower positioning sleeve 30, engagement sector 38 comprises 120° of arc relative to the longitudinal axis. Receiving sector 39 encompasses 240° of arc relative to the longitudinal axis. The upper terminus of mid-positioning sleeve 31 is formed into engagement sector 40 and receiving sector 41. Like the lower terminus, engagement sector 40 encompasses 120° of arc relative to the longitudinal axis, the receiving sector 41 encompassing 240° of arc.

The construction of upper positioning sleeve 32 is similar to lower positioning sleeve 30 and mid-positioning sleeve 31. Upper positioning sleeve 32 is constructed of a cylindrical member 45 and has a central bore 46 disposed therethrough along the longitudinal axis. The lower terminus of upper positioning sleeve 32 is formed into an engagement sector 47 and a receiving sector 48. Engagement sector 47 comprises 120° of arc relative to the longitudinal axis, receiving sector 48 comprising 240° of arc.

An objective of the present invention is to permit the support legs 20, 21 and 22 to rotate about base shaft 12 between the open or active position (FIG. 1) and the storage position (FIG. 2). To meet this objective, sleeves 30, 31 and 32 are adapted to lie in axial abutment with one another. Engagement sector 35 and receiving sector 36 of lower positioning sleeve 30 are adapted to engage receiving sector 39 and engagement sector 38, respectively, of mid-positioning sleeve 31. In a like manner, engagement sector 40 and receiving sector 41 of mid-positioning sleeve 30 are adapted to engage receiving sector 48 and engagement sector 47, respectively, of upper positioning sleeve 32. As shown in FIGS. 1 and 2, lower positioning sleeve 30 and upper positioning sleeve 32 are able to rotate about base shaft 12 relative to mid-positioning sleeve 31 a full 120° of arc. Since the angular rotation between the positioning sleeves 30, 31 and 32 are fully determined by the engagement and receiving surfaces of the positioning sleeves 30, 31 and 32, the present invention equipment support stand can efficiently be placed in the open position (FIG. 1) or storage position (FIG. 2), in an efficient manner which is superior to those disclosed in the prior art.

FIG. 1 illustrates the present invention equipment support stand in the conventional, open position. support legs 20, 21 and 22 are each separated from adjacent support legs by 120° of arc. Under these conditions, positioning sleeves 30, 31 and 32 are in axial abutment with one another. To stabilize the position of positioning sleeves 30, 31 and 32 in the position shown in FIG. 1, locking sleeve 50 is slidably urged downward to be in axial abutment with the upper terminus 49 of upper positioning sleeve 32. A threaded locking shaft 51 is engaged within aperture 52 of locking sleeve 50 and bears against the outer surface of base shaft 12. Releasing locking handle 1 will release the axial force on positioning sleeves 30, 31 and 32 and allow them to be rotated relative to one another until co-planar as shown in FIG. 2.

The structure of the present invention equipment support stand provides the flexibility to use the stand under difficult conditions. As can be seen in FIGS. 1, 2 and 3, the distance between support legs 20, 21 and 22 permit the placement of the equipment stand 10 to vary in order to compensate for the height of a variety of obstacles. FIG. 5 illustrates the use of the present invention equipment support stand 10 where an obstacle 60 either creates limited space for placement of the stand or necessitates greater flexibility to provide needed support. In FIG. 5, lower support leg 20 rests upon the support surface 29. By releasing locking member 50, upper positioning sleeve 32 may be urged upwardly toward the upper end of base shaft 12. Upper positioning leg 22 is braced against obstacle 60 thereby providing a stable base in combination with the contact between support legs 20 and 21 with supporting surface 29. As stated previously, mid-positioning sleeve 31 is in frictional engagement with the outer surface of base shaft 12. The frictional engagement in combination with the support provided by upper support leg 22 maintains the vertical position of riser 11.

We claim:

1. An equipment support stand for mounting and positioning photographic, motion picture and video accessories comprising:

(a) a riser comprising a cylindrical base shaft having an upper and lower end;

(b) a lower supporting member rotatable coupled about the lower end of said riser, said lower support member comprising an elongated support leg extending into a cylindrical, lower positioning sleeve adapted to be coupled about the base shaft and having upper and lower axial ends, said upper axial end having contiguous, complementary engagement and receiving surfaces disposed along the circumference thereof, and securing means for fixing the position of said lower positioning sleeve relative to said base shaft being disposed through said sleeve;

(c) a mid-supporting member rotatable coupled about said riser in abutment with said lower supporting member intermediate said lower support member and the upper end of said riser; and (d) an upper supporting member rotatable coupled about said riser in abutment with the mid-supporting member intermediate the mid-supporting member and the upper end of said riser, said lower support member, mid-support member and upper support member being rotatable relative to each other between a coplanar position and equiangular displacement about said riser.

2. An equipment support stand as defined in claim 1 wherein said mid-supporting member comprises an elongated support leg extending into a cylindrical mid-positioning sleeve coupled about the base shaft in axial abutment with the upper axial end of said lower positioning sleeve and having upper and lower axial ends, each having contiguous, complementary engagement and receiving surfaces disposed along the circumference thereof, the engagement and receiving surfaces of the lower axial end of said mid-positioning sleeve being in communication with the receiving and engagement surfaces respectively of the lower positioning sleeve whereby the angular displacement between said lower and mid-positioning sleeves is determined.

3. An equipment support stand as defined in claim 2 wherein said upper support member comprises an elongated support leg extending into a cylindrical, upper positioning sleeve coupled about the base shaft in axial abutment with the upper axial end of said mid-positioning sleeve and having upper and lower axial ends, the lower axial end having contiguous, complementary engagement and receiving surfaces disposed along the circumference thereof, the engagement and receiving surfaces being in communication with the receiving and engagement surfaces respectively of the upper axial end of said mid-positioning sleeve whereby the angular displacement between said upper and mid-positioning sleeves is determined.

4. An equipment support stand as defined in claim 3 wherein the engagement and receiving surfaces of said lower, upper and mid-positioning sleeves radially extend 120 degrees of arc and 240 degrees of arc respectively.

5. An equipment support stand as defined in claim 1 wherein said riser comprises a plurality of telescoping, annularly disposed cylindrical shafts.

6. An equipment support stand as defined in claim 1 further including a locking member disposed about said riser adjacent the upper supporting member.

* * * * *